United States Patent
Gupta et al.

(10) Patent No.: US 10,507,453 B2
(45) Date of Patent: Dec. 17, 2019

(54) NANOCLAY-BASED SOLID SORBENTS FOR CARBON DIOXIDE CAPTURE

(71) Applicants: Rakesh K. Gupta, Morgantown, WV (US); Sushant Agarwal, Morgantown, WV (US); Elliot Roth, Morgantown, WV (US)

(72) Inventors: Rakesh K. Gupta, Morgantown, WV (US); Sushant Agarwal, Morgantown, WV (US); Elliot Roth, Morgantown, WV (US)

(73) Assignee: West Virginia University, Morgantown, WV (US)

( * ) Notice: Subject to any disclaimer, the term of this patent is extended or adjusted under 35 U.S.C. 154(b) by 0 days.

(21) Appl. No.: 13/666,375

(22) Filed: Nov. 1, 2012

(65) Prior Publication Data

US 2013/0121903 A1     May 16, 2013

Related U.S. Application Data

(60) Provisional application No. 61/555,507, filed on Nov. 4, 2011.

(51) Int. Cl.
    *B01J 20/32*      (2006.01)
    *B01J 20/22*      (2006.01)
    (Continued)

(52) U.S. Cl.
    CPC .......... *B01J 20/3244* (2013.01); *B01D 53/02* (2013.01); *B01D 53/62* (2013.01); *B01J 20/10* (2013.01);
    (Continued)

(58) Field of Classification Search
None
See application file for complete search history.

(56) References Cited

U.S. PATENT DOCUMENTS

| | | |
|---|---|---|
| 4,810,266 A | 3/1989 | Zinnen et al. |
| 4,937,059 A | 6/1990 | Kolts et al. |
| (Continued) | | |

OTHER PUBLICATIONS

A. Cadene, S. Durand-Vidal, P. Turq, J. Brendle, "Study of individual Na-montmorillonite particles size, morphology, and apparent charge", Journal of Colloid and Interface Science 285 (2005) 719-730.*

(Continued)

*Primary Examiner* — Anita Nassiri-Motlagh
(74) *Attorney, Agent, or Firm* — Buchanan Ingersoll & Rooney PC; Craig G. Cochenour, Esq.

(57) ABSTRACT

A nanoclay based solid sorbent is provided having a nanoclay with at least one surface, and at least one amine containing compound wherein the amine containing compound is attached to the surface, as well as a method of making it. A method of capturing carbon dioxide gas is disclosed includes passing a gas from an effluent process stream containing carbon dioxide through the nanoclay based solid sorbent and capturing the carbon dioxide gas on the surface and within the nanoclay based solid sorbent. The nanoclay based solid sorbent having the captured carbon dioxide gas is regenerated by undergoing one or more cycles of desorption of the captured carbon dioxide gas from the nanoclay. The regenerated nanoclay based solid sorbent may then be reused.

11 Claims, 8 Drawing Sheets

(51) Int. Cl.
*B01D 53/62* (2006.01)
*B01J 20/10* (2006.01)
*B01J 20/12* (2006.01)
*B01D 53/02* (2006.01)

(52) U.S. Cl.
CPC ............... *B01J 20/12* (2013.01); *B01J 20/22* (2013.01); *B01J 20/3204* (2013.01); *B01J 20/3257* (2013.01); *B01J 20/3259* (2013.01); *B01J 20/3272* (2013.01); *B01D 2253/11* (2013.01); *B01D 2253/25* (2013.01); *B01D 2257/504* (2013.01); *Y02C 10/04* (2013.01); *Y02C 10/08* (2013.01); *Y02P 30/10* (2015.11)

(56) References Cited

U.S. PATENT DOCUMENTS

| | | |
|---|---|---|
| 5,620,940 A | 4/1997 | Birbara et al. |
| 5,876,488 A | 3/1999 | Birbara et al. |
| 6,364,938 B1 | 4/2002 | Birbara et al. |
| 6,547,854 B1 | 4/2003 | Gray et al. |
| 6,908,497 B1 | 6/2005 | Sirwardane |
| 2010/0263534 A1* | 10/2010 | Chuang ............ B01D 53/48 95/139 |

OTHER PUBLICATIONS

Faheem Uddin, "Clays, Nanoclays, and Montmorillonite Minerals", Metallurgical and Materials Transactions A, vol. 39A, Dec. 2009, pp. 2804-2814.*
Tonle et al., "Functionalization of natural smectite-type clays by grafting with organosilanes: physic-chemical characterization and application to mercury(II) uptake", Phys. Chem. Chem. Phys., 2003, 5, 4951-4961.*
Jonsson et al., "Structure and forces in bentonite MX-80", Swedish Nuclear Fuel and Waste Management Co., Mar. 2009.*
SigmaAldrich, Materials Science, Nanomaterials, "Nano Minerals: Nanoclays".*
Dillon, E.P. et al., Synthesis, Characterization, and Carbon Dioxide Adsorption of Covalently Attached Polyethyleneimine-Functionalized Single-Wall Carbon Nanotubes, ACS Nano, 2008, 155-164 vol. 2, No. 1, Am. Chem. Society.
Gray, M.L. et al., $CO_2$ Capture by Amine-Enriched Fly Ash Carbon Sorbents, Separation and Purification Technology, 2004, 31-36, vol. 35, Elsevier, B.V.
Gray, M.L. et al., Performance of Immobilized Tertiary Amine Solid Sorbents for the Capture of Carbon Dioxide, International Journal of Greenhouse Gas Control, 2008, 3-8, vol. 2, Elsevier, LTD.
Huang, H.Y. et al., Amine-Grafted MCM-48 and Silica Xerogel as Superior Sorbents for Acidic Gas Removal from Natural Gas, Ind. Eng. Chem. Res., 2003, 2427-2433, vol. 42, Am. Chem. Society.
Aaron, D. et al., Separation of $CO_2$ from Flue Gas: A Review, Separation Science and Technology, 2005, 321-348, vol. 40, Taylor & Francis.
Chang, A.C.C. et al., In-Situ Infrared Study of $CO_2$ Adsorption on SBA-15 Grafted with (Aminopropyl)triethoxysilane, Energy & Fuels, 2003, 468-473, vol. 17, Am. Chem. Society.
Choi, S. et al., Adsorbent Materials for Carbon Dioxide Capture from Large Anthropogenic Point Sources, ChemSusChem, 2009, 796-854, vol. 2, Wiley-VCH Verlag GmbH& Co.
Ciferno, J.P. et al., Capturing Carbon Dioxide from Existing Coal-Fired Power Plants, Chemical Engineering Progress, 2009, 33-41, American Institute of Chemical Engineers.
Gray, M.L. et al., Improved Immobilized Carbon Dioxide Capture Sorbents, Fuel Processing Technology, 2005, 1449-1455, vol. 86, Elsevier B.V.
Gupta, R.K. et al., Handbook of Polymer Nanocomposites, 2008, 1-6, CRC Press.
Hiyoshi, N. et al., Adsorption Characteristics of Carbon Dioxide on Organically Functionalized SBA-15, Microporous and Mesoporous Materials, 2005, 357-365, vol. 84, Elsevier, Inc.
Khatri, R.A. et al., Carbon Dioxide Capture by Diamine-Grafted SBA-15: A Combined Fourier Transform Infrared and Mass Spectrometry Study, Ind. Eng. Chem. Res., 2005, 3702-3708 vol. 44, Am. Chem. Society.
Lee, S. et al., Screening Test of Solid Amine Sorbents for $CO_2$ Capture, Ind. Eng. Chem. Res., 2008, 7419-7423, vol. 47, Am. Chem. Society.
Plaza, M.G. et al., Application of Thermogravimetric Analysis to the Evaluation of Aminated Solid Sorbents for $CO_2$ Capture, Journal of Thermal Analysis and Calorimetry, 2008, 601-606, vol. 92, No. 2, Akademiai Kiado, Budapest.
Shekhawat, D. et al., A Review of Carbon Dioxide Selective Membranes—A Topical Report, National Energy Technology Laboratory, United States Department of Energy, 2003, 1-93.
Sridhar, S. et al., Separation of Carbon Dioxide from natural Gas Mixtures through Polymeric Membranes—A Review, Separation & Purification Reviews, 2007, 113-174, vol. 36, Taylor & Francis, UK.
Suh, J. et al., Ionization of Polyethylenimine and Polyallylamine at Various pH's, Bioorganic Chemistry, 1994, 318-327, vol. 22, Academic Press, Inc.
Utracki, L.A. et al., Synthetic, Layered Nanoparticles for Polymeric Nanocomposites (PNCs), Polymers for Advanced Technologies, 2007, 1-37, vol. 18, John Wiley & Sons, Ltd.
Wang, Ke et al., Preparation of Highly Exfoliated Epoxy/Clay Nanocomposites by "Slurry Compounding": Process and Mechanisms, Langmuir, 2005, 3613-3618, vol. 21, Am. Chem. Society.
Webb, K.F. et al., Solubility and Diffusion of Carbon Dioxide in Polymers, Fluid Phase Equilibria, 1999, 1029-1034, vol. 158-160, Elsevier Science B.V.
Xu, X. et al., Preparation and Characterization of Novel $CO_2$ "molecular Basket" Adsorbents Based on Polymer-modified Mesoporous Molecular Sieve MCM-41, Microporous and Mesoporous Materials, 2003, 29-45, vol. 62, Elsevier, Inc.
Yang, H. et al., Progress in Carbon Dioxide Separation and Capture: A Review, Journal of Environmental Sciences, 2008, 14-27, vol. 20, ScienceDirect.
Zelenak, V. et al., Amine-Modified Ordered Mesoporous Silica: Effect of Pore Size on Carbon Dioxide Capture, Chemical Engineering Journal, 2008, 336-342, vol. 144, Elsevier Science, B.V.

* cited by examiner

| Temperature °C | wt% CO$_2$ adsorbed |
|---|---|
| 50 | 4.58 |
| 75 | 5.93 |
| 85 | 5.96 |
| 100 | 5.07 |
| 125 | 4.49 |
| 150 | 4.12 |

FIG. 1

| Temperature °C | wt% CO$_2$ adsorbed |
|---|---|
| 50 | 2.41 |
| 75 | 6.01 |
| 85 | 6.15 |
| 100 | 6.29 |
| 125 | 3.86 |
| 150 | 1.30 |

FIG. 2

| Temperature °C | wt% CO$_2$ adsorbed |
|---|---|
| 50 | 2.26 |
| 75 | 3.71 |
| 85 | 8.70 |
| 100 | 5.65 |
| 125 | 5.36 |
| 150 | 3.00 |

FIG. 3

|  | 40 psi | | | 100 psi | | | 200 psi | | | 300 psi | | | |
|---|---|---|---|---|---|---|---|---|---|---|---|---|---|
|  | 2 hrs | 16 hrs | 24 hrs | 2 hrs | 16 hrs | 24 hrs | 2 hrs | 16 hrs | 24 hrs | 2 hrs | 16 hrs | 24 hrs | 72 hrs |
| APTMS | 7.5 | 7.6 | 7.6 | 4.2 | 7.1 | 8.6 | 9.4 | 6.5 | 6.3 | 7.2 | 7.2 | 7.6 | 8.7 |
| PEI | 5.2 | 12.0 | 14.4 | 3.5 | 8.2 | 5.9 | 5.7 | 7.0 | 6.7 | 3.1 | 6.4 | 6.8 | --- |
| APTMS+ PEI | 5.5 | 5.2 | 9.9 | 11.9 | 9.9 | 5.0 | 4.6 | 9.0 | 10.1 | 8.2 | 8.5 | 11.8 | --- |
| Only nanoclay | 1.2 | 1.4 | 1.4 | --- | 1.0 | 1.9 | 1.6 | 1.4 | 1.5 | 1.3 | 1.0 | 3.8 | --- |

FIG. 5

NANOCLAY-BASED SOLID SORBENTS FOR CARBON DIOXIDE CAPTURE

CROSS-REFERENCE TO RELATED APPLICATIONS

This utility patent application claims the benefit of pending U.S. Provisional Patent Application Ser. No. 61/555,507, filed on Nov. 4, 2011. The entire contents of U.S. Provisional Patent Application Ser. No. 61/555,507 is incorporated by reference into this utility patent application as if fully written herein.

STATEMENT REGARDING FEDERALLY SPONSORED RESEARCH OR DEVELOPMENT

Not applicable.

BACKGROUND OF THE INVENTION

1. Field of the Invention

The present invention provides a nanoclay based solid sorbent comprising a nanoclay with at least one surface, and at least one amine containing compound wherein said amine containing compound is attached to said surface. A method of making this nanoclay based solid sorbent is also provided. A method of capturing carbon dioxide gas comprising passing a gas from an effluent process stream containing carbon dioxide through the nanoclay based solid sorbent of this invention is provided for capturing the carbon dioxide on and within the nanoclay. Regeneration of the nanoclay based solid sorbent by at least one cycle of desorption of the captured carbon dioxide gas from the nanoclay is provided.

2. Description of the Background Art

Capture of carbon dioxide is considered as an important step in reducing the emission of greenhouse gases. Solid sorbents are one means of achieving carbon capture. To make an effective solid sorbent for carbon dioxide sorption, a high surface area base material is required on which a chemical moiety is immobilized; this reacts with carbon dioxide molecules to achieve separation. A temperature swing or pressure swing method can be used to regenerate the solid sorbent. Current solid sorbents are problematic. The current sorbents are expensive to produce since they use expensive solid base material and therefore, they cannot be produced in large enough quantities to be used in existing plants where thousands of pounds of solid sorbents may be required per day. Also, many existing solid sorbents do not have high carbon dioxide capture capacity.

A solid sorbent using easily available low cost materials would be a large improvement in the ability to capture carbon dioxide. Additionally, the ability to make solid sorbents which can be produced on large scales using well-established industrial methods is needed.

Nanoclays are primarily used to make polymer nanocomposites and as viscosity modifiers in various products such as drilling fluids and skin-care products. They are very low-cost compared to other nano-sized products such as carbon nanotubes. These clays cost only few dollars a pound as compared to hundreds or thousands dollars a pound for more exotic materials like metal organic frame works or carbon nanotubes. The nanoclays can also be mined and then processed in very large quantities compared to other solid sorbents which can be produced only in limited amounts.

A variety of solid sorbents have been evaluated for use with post-combustion flue gases. For example, porous silica grafted with amines (Chang et al., 2003; Gray et al., 2005; Hiyashi et al., 2005; Khatri et al., 2005; Zelenak et al., 2008), amine grafted molecular baskets of silica aerogels (Huang et al., 2003; Xu et al., 2003), porous PMMA beads with immobilized amines (Gray et al., 2007; Lee et al., 2008), porous alumina with amine (Plaza et al., 2008) and fly ash with grafted amine (Gray et al., 2004) have been investigated as $CO_2$ solid sorbents.

For the existing solid sorbents mentioned above, reported adsorption capacities vary widely from about ~200 mmol $CO_2$/gm to ~4000 mmol $CO_2$/gm (~0.9 wt % to ~18 wt %) of sorbent. It has been suggested that the sorbent should have at least 2000 mmol/gm (~9 wt %) long term capture capacity to be considered as a viable candidate for practical use (Chang et al., 2003). However, it should be noted that the $CO_2$ capture capacity is not the sole criterion for choosing a viable candidate for use at the industrial level. Several other criteria such as availability in large quantity, low cost and ease of production are important benchmarks as well in developing a usable solid sorbent. Current methods of making these solid sorbents are not scalable, however the proposed invention can be produced at large scale using well-established industrial methods. The proposed invention is very low cost compared to other products in the field, which gives this invention very significant advantage over other technologies. Additionally, many existing solid sorbents do not have high carbon dioxide capture capacity; this present invention achieves much higher capture capacity.

In spite of the background art, there remains a very real and substantial need for a nanoclay-based solid sorbent for capturing carbon dioxide gas, for example but not limited to the carbon dioxide gas that is contained in an effluent process stream.

Current solid sorbents suffer from the following problems: they are expensive to produce since they use expensive solid base material, and they cannot be produced in large enough quantities to be used in existing plants where thousands of pounds of solid sorbents may be required per day.

SUMMARY OF THE INVENTION

The present invention solves the problems of current solid sorbents by using easily available low cost materials to make solid sorbents which can be produced on large scales using well-established industrial methods. Additionally, many existing solid sorbents do not have high carbon dioxide capture capacity. This invention achieves a much higher capture capacity.

In one embodiment, a nanoclay based solid sorbent is provided comprising a nanoclay with at least one surface having at least one amine containing compound attached to the surface of the nanoclay. In a preferred embodiment of this invention, the nanoclay of the nanoclay based solid sorbent is one of the following: a montmorillonite, a bentonite, a kaolinite, a halloysite, or a synthetic nanoclay, a mixed-metal hydroxide nanoclay, a layered double hydroxide ("LDH") nanoclay. In yet another preferred embodiment, the synthetic nanoclay of the nanoclay based solid sorbent of this invention is one of the following: a laponite, a hectorite, a saponite, an indonite, or a sepiocite.

In yet another embodiment of the nanoclay based solid sorbent of this invention provides that the amine containing compound of the nanoclay based solid sorbent is an organoamine or an aminosilane. In a preferred embodiment, the organoamine a polyamine or an polyethyleneimine.

In another embodiment of the nanoclay based solid sorbent of the present invention, the amine containing compound is an aminosilane. Preferably, the aminosilane is one of the following: an aminopropyltrimethoxysilane, an amiopropyltrimethoxysilane, a N-3-trimethoxysilyl-propyl-ethylenediamine, a N-3-trimethoxysilyl-propyl-diethylenediamine, an ethylhydroxylaminopropyl-trimethoxysilane, or a diethylhydroxyl-aminopropyltrimethoxysilane.

In another embodiment, at least one amine containing compound is grafted onto the surface of the nanoclay, and optionally at least one amine containing compound is immobilized on the surface of the nanoclay. In a preferred embodiment, the amine containing compound that is grafted onto said surface of the nanoclay is one of the following: an aminopropyltrimethoxysilane, an amiopropyltrimethoxysilane, a N-3-trimethoxysilyl-propyl-ethylenediamine, a N-3-trimethoxysilyl-propyl-diethylenediamine, an ethylhydroxylaminopropyl-trimethoxysilane, or a diethylhydroxyl-aminopropyltrimethoxysilane. In another preferred embodiment, the amine containing compound that is immobilized onto said surface of the nanoclay is polyethyleneimine. In a more preferred embodiment, the amine containing compound that is grafted onto the surface of the nanoclay is aminopropyltrimethoxysilane and the amine containing compound that is immobilized onto the surface of the nanoclay is polyethyleneimine.

In another embodiment, the surface of the nanoclay includes at least one of the following: an edge of a platelet of said nanoclay, and an interior portion of said nanoclay, and an external surface of the nanoclay.

In another embodiment, a method of making a nanoclay based solid sorbent includes providing a nanoclay having at least one surface and attaching at least one amine containing compound onto the surface of the nanoclay. In a preferred embodiment, the amine containing compound is attached to the surface of the nanoclay by grafting the amine containing compound onto the surface.

In another embodiment, a method of making a nanoclay based solid sorbent includes wherein at least one amine containing compound is attached to the surface of the nanoclay by immobilizing the amine containing compound onto the surface.

In another embodiment, a method of making a nanoclay based solid sorbent includes wherein the nanoclay is one of the following: a montmorillonite, a bentonite, a kaolinite, a halloysite, a synthetic nanoclay, as described herein, In yet another preferred embodiment, the synthetic nanoclay is a double layered hydroxide nanoclay. In yet another preferred embodiment, the synthetic nanoclay is one of the following: a laponite, a hectorite, a saponite, an indonite, or a sepiocite.

In another embodiment, a method of making a nanoclay based solid sorbent includes wherein the amine containing compound is an organoamine. In a preferred embodiment, the organoamine is a polyamine or an aminosilane. In a more preferred embodiment, the aminosilane is one of the following: an aminopropyltrimethoxysilane, an amiopropyltrimethoxysilane, a N-3-trimethoxysilyl-propyl-ethylenediamine, a N-3-trimethoxysilyl-propyl-diethylenediamine, ethylhydroxylaminopropyl-trimethoxysilane, or a diethylhydroxyl-aminopropyltrimethoxysilane. In another preferred embodiment, the organoamine is polyethyleneimine.

In another embodiment, a method of making a nanoclay based solid sorbent includes wherein at least one of the amine containing compounds is attached to the surface of the nanoclay by grafting the amine containing compound onto the surface, and optionally including wherein at least one of the amine containing compounds is attached to the surface of the nanoclay by immobilizing the amine containing compound onto the surface of the nanoclay. In a preferred embodiment, the method of making a nanoclay based solid sorbent includes wherein a first amine containing compound is grafted to the surface of the nanoclay, followed by immobilizing a second amine containing compound onto the surface of the nanoclay, wherein the first and the second amine containing compounds are different compounds. In another preferred embodiment, the method of making a nanoclay based solid sorbent includes attaching one or more amine containing compounds by grafting and immobilization to the surface of the nanoclay in any order of addition, or simultaneously. In yet another preferred embodiment, the method of making a nanoclay based solid sorbent includes wherein the first amine containing compound that is grafted onto the surface of the nanoclay is one of the following: an aminopropyltrimethoxysilane, an amiopropyltrimethoxysilane, a N-3-trimethoxysilyl-propyl-ethylenediamine, a N-3-trimethoxysilyl-propyl-diethylenediamine, an ethylhydroxylaminopropyl-trimethoxysilane, or a diethylhydroxyl-aminopropyltrimethoxysilane. In yet another preferred embodiment, the method of making a nanoclay based solid sorbent includes wherein the second amine containing compound that is immobilized onto the surface of the nanoclay is a polyamine. In a more preferred embodiment, the method of making a nanoclay based solid sorbent includes wherein the polyamine is polyethyleneimine. In yet another preferred embodiment, the method of making a nanoclay based solid sorbent includes wherein the first amine containing compound is aminopropyltrimethoxysilane and the second amine containing compound is polyethyleneimine.

In another embodiment of the present invention, a method of making a nanoclay based solid sorbent is provided comprising providing a nanoclay, as described herein, wherein said nanoclay has at least one surface, as described herein, and attaching at least one amine containing compound, as described herein, onto the surface of the nanoclay. In a preferred embodiment of this method, at least one amine containing compound is attached to the surface of the nanoclay by grafting the amine containing compound onto the surface of the nanoclay. In a preferred embodiment of this invention, at least one amine containing compound is attached to the surface of the nanoclay by immobilizing the amine containing compound onto the surface of the nanoclay.

Yet in another embodiment of this invention, a method of capturing carbon dioxide gas is provided. This method comprises passing a gas from an effluent process stream containing carbon dioxide through a nanoclay based solid sorbent comprising a nanoclay, as described herein, with at least one surface, as described herein, and at least one amine containing compound, as described herein, wherein the amine containing compound is attached to the surface, and capturing the carbon dioxide gas on the surface of and within the nanoclay based solid sorbent. Optionally, this method further includes wherein after capturing the carbon dioxide gas on and within the nanoclay based solid sorbent, the nanoclay based solid sorbent is regenerated by at least one or more cycles of desorption of the captured carbon dioxide gas from the nanoclay.

BRIEF DESCRIPTION OF THE DRAWINGS

FIG. 1 is a table that shows $CO_2$ adsorption capacity as a function of temperature at atmospheric pressure (1 atm or 14.7 psi) of a montmorillonite nanoclay of this invention grafted with only APTMS.

FIG. 2 is a table that shows $CO_2$ adsorption capacity as a function of temperature at atmospheric pressure (1 atm or 14.7 psi) of a montmorillonite nanoclay of this invention grafted with only PEI.

FIG. 3 is a table that shows $CO_2$ adsorption capacity as a function of temperature at atmospheric pressure (1 atm or 14.7 psi) of a montmorillonite nanoclay of this invention grafted with APTMS and having immobilized PEI.

FIG. 4 shows that desorption is easily achieved by raising the temperature to only 100° C. and the solid sorbent can be regenerated and re-used over multiple cycles.

FIG. 5 is a table that shows $CO_2$ capture capacities of unmodified and modified montmorillonite nanoclay of this invention at room temperature (about 21 degrees Centigrade) as a function of pressure and time.

FIG. 6 shows that even higher capture capacities are obtained at high temperature and pressure.

DETAILED DESCRIPTION OF THE INVENTION

Figure 4:
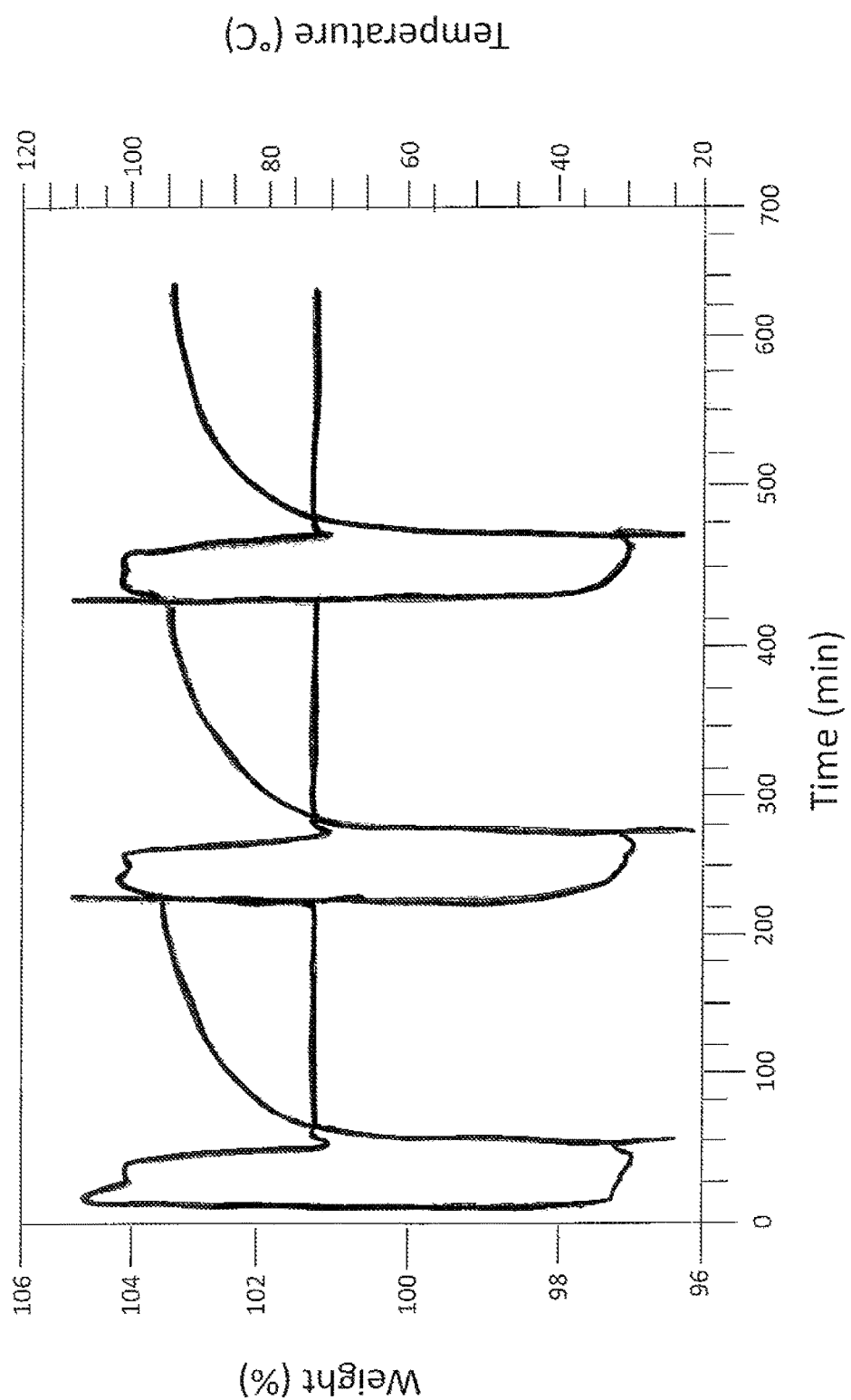
FIG. 4 is a graph showing the adsorption and desorption cycling of a PEI grafted montmorillonite nanoclay of this invention.

As used herein, the term "nanoclay" refers to nanoparticles of a clay material (a naturally occurring mineral, an organically modified mineral, or a synthetic nanomaterial) having a platelet structure. For example, but not limited to, a nanoclays are nanoparticles of layered minerals, including for example but not limited to, a montmorillonite, a bentonite, a kaolinite, and a halloysite. For example, those persons skilled in the art understand that montmorrillonite is a 2:1 layered smectite clay mineral having a platelet structure, and that halloysite nanoclays are a 1:1 aluminosilicate clay mineral having an empirical formula of Al2Si2O5(OH) 4. An example of nanoclay is Cloisite®, nanometer scale layered magnesium aluminum silicate platelets, commercially available from Southern Clay Products, Inc., Gonzales, Tex. Cloisite®, a montmorillonite nanoclay, can be obtained commercially in pristine or organically modified form. Other examples of synthethic nanoclays include but are not limited to a mixed-metal hydroxide nanoclay; a layered double hydroxide ("LDH") nanoclay such as sepiocite; a laponite; a hectorite; a saponite; and an indonite.

As used herein, the term "amine containing compound" refers to a chemical molecule having at least one amine group (NH2), and includes for example but not limited to an organoamine (compounds containing at least one carbon atom and at least one amine group), and an aminosilane (compounds containing silicon and hydrogen and at least one amine group). An organoamine may be for example, but not limited to, a polyamine. Those persons skilled in the art understand that a polyamine includes for example but is not limited to polyethyleneimine ("PEI"). Those persons skilled in the art understand that an aminosilane includes for example but is not limited to aminopropyltrimethoxysilane ("APTMS"), amiopropyltrimethoxysilane ("APTES"), N-3-trimethoxysilyl-propyl-ethylenediamine ("AEAPTS"), N-3-trimethoxysilyl-propyl-diethylenediamine ("DAEAPTS"), ethylhydroxylaminopropyl-trimethoxysilane ("EHAPTMS"), and diethylhydroxyl-aminopropyltrimethoxysilane ("DEHAPTMS").

As used herein, the terms "grafting" or "grafted" refer to attaching an amine containing compound, as described herein, to the platelets of the surface of a nanoclay by covalent bonding which is formed between the hydroxyl groups present on the edges of the platelets of the surface of the nanoclay, as described herein, and the amine containing compound, such as for example an aminosilane, as described herein. The entire amine containing compound is attached to the edges of the platelet of the surface of the nanoclay. Grafting of the amine containing compound prevents its easy removal from the edge of the platelet by simple washing with a solvent such as water or methanol or subjecting it to other mechanical means, such as friction forces caused by a rubbing motion.

As used herein, the terms "immobilization", "immobilizing", or "immobilized" refer to attaching an amine containing compound, as described herein, to the surface of a nanoclay, as described herein, by coating the substantial entirety of the surface of the nanoclay, while not being bound by any one particular theory, by electrostatic bonding where a bond is formed by a negatively charged nanoclay surface and a positively charged amine containing compound, for example PEI, and by physical attachment. Thus, an amine containing compound attached to the surface of a nanoclay by "immobilization" or "immobilizing" may be easily and simply removed from the surface of the nanoclay by simple washing with a solvent such as methanol or water or subjecting it to other mechanical means, such as friction forces caused by a rubbing motion.

As used herein, the term "surface" refers to the surface of the nanoclay which includes one or more or all of the following: an edge of a platelet of the nanoclay, an interior portion of the nanoclay, an exterior portion of the nanoclay, and the edge of a platelet, interior and exterior portions of each layer of the nanoclay.

As used herein, the term "atmospheric pressure" refers to about 1 atm (14.7 psi) pressure.

In one embodiment of this invention, the invention achieves a much higher capture capacity than typical sorbents at a much cheaper cost utilizing nanoclays.

In one embodiment of this invention, a nanoclay based solid sorbent is provided comprising a nanoclay with at least one surface having at least one amine containing compound attached to the surface of the nanoclay. In a preferred embodiment, the nanoclay of the nanoclay based solid sorbent is one of the following: a montmorillonite, a bentonite, a kaolinite, a halloysite, a synthetic nanoclay, a mixed-metal hydroxide nanoclay, and a layered double hydroxide nanoclay. In yet another preferred embodiment, the synthetic nanoclay is one of the following: a laponite, a hectorite, a saponite, an indonite, or a sepiocite.

In yet another embodiment, the amine containing compound of the nanoclay based solid sorbent is an organoamine or an aminosilane. In a preferred embodiment, the organoamine is either a polyamine or a polyethyleneimine ("PEI"). In a more preferred embodiment, the aminosilane is one of the following: an aminopropyltrimethoxysilane, an amiopropyltrimethoxysilane, a N-3-trimethoxysilyl-propyl-ethylenediamine, a N-3-trimethoxysilyl-propyl-diethylenediamine, an ethylhydroxylaminopropyl-trimethoxysilane, or a diethylhydroxyl-aminopropyltrimethoxysilane.

In another embodiment, at least one amine containing compound is grafted onto the surface of the nanoclay, and optionally at least one amine containing compound is immobilized on the surface of the nanoclay. In a preferred embodiment, the amine containing compound that is grafted onto said surface of the nanoclay is one of the following: an aminopropyltrimethoxysilane, an amiopropyltrimethoxysilane, a N-3-trimethoxysilyl-propyl-ethylenediamine, a N-3-trimethoxysilyl-propyl-diethylenediamine, an ethylhydroxylaminopropyl-trimethoxysilane, or a diethylhydroxyl-aminopropyltrimethoxysilane. In another preferred embodiment, the amine containing compound that is immobilized onto said surface of the nanoclay is polyethyleneimine. In a more preferred embodiment, the amine containing compound that is grafted onto the surface of the nanoclay is aminopropyltrimethoxysilane and the amine containing compound that is immobilized onto the surface of the nanoclay is polyethyleneimine.

The surface of the nanoclay includes at least one of the following: an edge of a platelet of the nanoclay, an interior portion of the nanoclay, and an exterior portion of the nanoclay, and any such edge of a platelet, interior portion, and exterior portion of each layer making up a layered nanoclay.

In another embodiment, a method of making a nanoclay based solid sorbent is provided comprising providing a nanoclay having at least one surface and attaching at least one amine containing compound onto the surface of the nanoclay. In a preferred embodiment of this method, the amine containing compound is attached to the surface of the nanoclay by grafting the amine containing compound onto the surface. In another embodiment of this method, at least one amine containing compound is attached to the surface of the nanoclay by immobilizing the amine containing compound onto the surface. These methods include wherein the nanoclay is one of the following: a montmorillonite, a bentonite, a kaolinite, a halloysite, or a synthetic nanoclay. In a preferred embodiment, the synthetic nanoclay is a mixed-metal hydroxide nanoclay. In yet another preferred embodiment, the synthetic nanoclay is a double layered hydroxide nanoclay. In yet another preferred embodiment, the synthetic nanoclay is one of the following: a laponite, a hectorite, a saponite, an indonite, or a sepiocite. In this method, the amine containing compound is an organoamine or an aminosilane. In a preferred embodiment, the organoamine is a polyamine or polyethyleneimine. In a more preferred embodiment of this method, the aminosilane is one of the following: an aminopropyltrimethoxysilane, an amiopropyltrimethoxysilane, a N-3-trimethoxysilyl-propyl-ethylenediamine, a N-3-trimethoxysilyl-propyl-diethylenediamine, ethylhydroxylaminopropyl-trimethoxysilane, or a diethylhydroxyl-aminopropyltrimethoxysilane.

In another embodiment, a method of making a nanoclay based solid sorbent of this invention includes wherein at least one of the amine containing compounds is attached to the surface of the nanoclay by grafting the amine containing compound onto the surface, and optionally including wherein at least one of the amine containing compounds is attached to the surface of the nanoclay by immobilizing the amine containing compound onto the surface of the nanoclay. In a preferred embodiment, the method of making a nanoclay based solid sorbent includes wherein a first amine containing compound is grafted to the surface of the nanoclay, followed by immobilizing a second amine containing compound onto the surface of the nanoclay, wherein the first and the second amine containing compounds are different compounds. In another preferred embodiment, the method of making a nanoclay based solid sorbent includes attaching one or more amine containing compounds by grafting and immobilization to the surface of the nanoclay in any order of addition, or simultaneously. In yet another preferred embodiment, the method of making a nanoclay based solid sorbent includes wherein the first amine containing compound that is grafted onto the surface of the nanoclay is one of the following: an aminopropyltrimethoxysilane, an amiopropyltrimethoxysilane, a N-3-trimethoxysilyl-propyl-ethylenediamine, a N-3-trimethoxysilyl-propyl-diethylenediamine, an ethylhydroxylaminopropyl-trimethoxysilane, or a diethylhydroxyl-aminopropyltrimethoxysilane. In yet another preferred embodiment, the method of making a nanoclay based solid sorbent includes wherein the second amine containing compound that is immobilized onto the surface of the nanoclay is a polyamine or a polyethyleneimine. In yet another preferred embodiment, the method of making a nanoclay based solid sorbent includes wherein the first amine containing compound is aminopropyltrimethoxysilane and the second amine containing compound is polyethyleneimine.

In another embodiment, a method of capturing carbon dioxide gas is provided comprising passing a gas from an effluent process stream containing carbon dioxide through a nanoclay based solid sorbent comprises a nanoclay, as described herein, wherein the nanoclay has at least one surface, as described herein, and at least one amine containing compound, as described herein, wherein the amine containing compound is attached to the surface, and capturing the carbon dioxide gas on the surface and within the nanoclay based solid sorbent. The nanoclay is one of the following: a montmorillonite, a bentonite, a kaolinite, a halloysite, or a synthetic nanoclay. In a preferred embodiment, the synthetic nanoclay is a mixed-metal hydroxide nanoclay. In another preferred embodiment, the synthetic nanoclay is a layered double hydroxide ("LDH") nanoclay or is one of the following: a laponite, a hectorite, a saponite, an indonite, or a sepiocite. The amine containing compound is an organoamine, as described herein, or an aminosilane, as described herein. In a more preferred embodiment of this method of capturing carbon dioxide gas, the organoamine is a polyamine or polyethyleneimine. In yet another preferred embodiment of this method of capturing carbon dioxide gas, the aminosilane is one of the following: an aminopropyltrimethoxysilane, an amiopropyltrimethoxysilane, a N-3-trimethoxysilyl-propyl-ethylenediamine, a N-3-trimethoxysilyl-propyl-diethylenediamine, an ethylhydroxylaminopropyl-trimethoxysilane, or a diethylhydroxyl-aminopropyltrimethoxysilane.

In yet another embodiment, the method of capturing carbon dioxide gas includes wherein at least one amine containing compound is grafted onto the surface of the nanoclay, and optionally wherein at least one amine containing compound is immobilized on the surface of the nanoclay. In a preferred embodiment, the amine containing compound that is grafted onto the surface of the nanoclay is one of the following: an aminopropyltrimethoxysilane, an amiopropyltrimethoxysilane, a N-3-trimethoxysilyl-propyl-ethylenediamine, a N-3-trimethoxysilyl-propyl-diethylenediamine, an ethylhydroxylaminopropyl-trimethoxysilane, or a diethylhydroxyl-aminopropyltrimethoxysilane. In another preferred embodiment, the amine containing compound that is immobilized onto the surface of the nanoclay is polyethyleneimine. In yet another preferred embodiment, the amine containing compound that is grafted onto the surface of the nanoclay is aminopropyltrimethoxysilane, and wherein the amine containing compound that is immobilized onto the surface of the nanoclay is polyethyleneimine.

In yet another embodiment, the method of capturing carbon dioxide gas includes wherein after capturing the carbon dioxide gas into the nanoclay based solid sorbent, the method further includes regenerating the nanoclay based solid sorbent by one or more cycles of desorption of the captured carbon dioxide gas from the nanoclay.

The methods of this invention include wherein the surface of the nanoclay includes at least one of an edge of a platelet of the nanoclay, an interior portion of the nanoclay, and/or an exterior portion of the nanoclay.

Preparing the embodied nanoclays for carbon dioxide capture can involve one or two major steps. In the first step, the nanoclay is modified to graft one amine and in the second step another amine group is immobilized on the nanoclay. Either the first or second step can be used exclusively or they can be combined in order to further enhance carbon capture capacity. The utilization of high surface area of nanoclay platelets ensures that the amine groups are exposed to the $CO_2$ gas for the capture to occur.

The present invention is a new kind of solid sorbent material to capture carbon dioxide gas from various sources. Capture of carbon dioxide is considered an important step in reducing the emission of greenhouse gases. The main application of this product will be to capture carbon dioxide either for sequestration purposes or for gas purification. Based on this, the following industrial uses, made by way of example and in no way limiting, are proposed: carbon dioxide capture and removal from flue gases from electric power plants burning carbon fuels such as coal, petroleum, natural gas, biomass, solid waste, etc.; refineries, petrochemical plants; purification of natural gas; purification of atmosphere by removing carbon dioxide from enclosed atmospheres such as sub marines and spacecrafts; separation of gases—removal of carbon dioxide from mixture of gases; and food packaging industry.

The present invention offers a novel way of modifying nanoclays so that they can be used to capture carbon dioxide in a regenerable and reusable fashion. The present invention offers a new application for nanoclays and a low cost and high-volume alternative of making solid sorbents for $CO_2$ capture.

To make an effective solid sorbent for carbon dioxide sorption, a high surface area base material is required on which a chemical moiety is immobilized; this reacts with carbon dioxide molecules to achieve separation. Later temperature swing or pressure swing method is used to regenerate the solid sorbent.

In the present invention, it is proposed to use layered nanoclays, such as for example but not limited to, montmorillonite and layered double hydroxides, which can achieve very high surface area when dispersed. Various organoamines can be used to graft amines onto the nanoclays. An amine-modified nanoclay is then used as a solid sorbent. When these nanoclays are exposed to carbon dioxide, amine groups immobilized on the high surface of the nanoclay react with carbon dioxide molecules, resulting in carbon dioxide capture.

A packed bed of solid sorbent can be placed at the carbon dioxide emission source such as the flue gases from a combustion source. Carbon dioxide adsorption and separation takes place when carbon dioxide containing gas mixture comes in contact with the solid sorbent.

In addition to uses described above, this kind of nanoclay solid sorbent can be used to make a polymer nanocomposite which can be employed as a membrane material for gas separation, making sensors for carbon dioxide detection, and as a gas barrier or packaging material. Other usages can be realized in the future.

There are different kinds of layered nanoclays that can be used such as, for example but not limited to, naturally occurring kaolinites, bentonite, montmorillonite clays, and various synthetic clays, for example but not limited to those based upon mixed-metal hydroxides. There are many organoamines that can also be used such as various polyamines as well as many aminosilanes.

EXAMPLES

The following examples are illustrative only and do not encompass the full scope of nor limit the invention.

A first embodiment is the use of layered nanoclays, such as, for example but not limited to, montmorillonite or layered double hydroxides, which can achieve a very high surface area when dispersed as nanoclay based sorbents for carbon dioxide capture. Various organoamines can be utilized to graft amines onto the nanoclays. The amine-modified nanoclay can then be used as solid sorbent. When these nanoclays are exposed to carbon dioxide, amine groups immobilized on high surface area nanoclay react with carbon dioxide molecules resulting in carbon dioxide capture. The layered nanoclays that can be varied from sources such as, for example but not limited to, naturally occurring kaolinites, bentonite, montmorillonite clays and various synthetic clays based on mixed-metal hydroxides. There are also many organoamines that can also be used such as, for example but not limited to, various polyamines and many aminosilanes. Additionally, this kind of nanoclay solid sorbent can be used to make polymer nanocomposite which can be employed as, for example but not limited to, membrane material for gas separation, making sensors for carbon dioxide detection, and gas barrier or packaging material. This embodiment can capture carbon dioxide either for sequestration purpose or for gas purification. For example, a packed bed of solid sorbent can be placed at the carbon dioxide emission source such as the flue gases from a combustion source. Carbon dioxide adsorption and separation takes place when carbon dioxide containing gas mixture comes in contact with the solid sorbent. Therefore, in industrial settings alone the embodiment may be used for carbon dioxide capture and removal from flue gases from electric power plants burning carbon fuels such as, for example but not limited to, coal, petroleum, natural gas, biomass, solid waste etc.; in refineries, petrochemical plants; for the purification of natural gas; for the purification of atmosphere by removing carbon dioxide from enclosed atmospheres such as submarines and spacecrafts; for the separation of gases-removal of carbon dioxide from mixture of gases, and the food packaging industry.

Step 1 Grafting of Amine Compound #1

The purpose of this step is to use various reactive sites present on the nanoclay to graft amine groups for carbon dioxide capture. Montmorillonite nanoclay is dispersed either in toluene or dimethyl formamide (DMF). Nanoclay may be dispersed in water also prior to this. To impart amine functionality to the nanoclay, Aminopropyltrimethoxysilane (APTMS) is added to the nanoclay dispersion. For example, 0.8 gm of APTMS/gm of nanoclay can be added. The dispersion is stirred for 24 hrs using a magnetic stirrer and then the dispersion is filtered. The treated nanoclay is then washed with excess solvent to wash away unreacted APTMS. The nanoclay is then dried for an effective amount of time in an oven, such as for example but not limited to, at 75° C. for 12 hrs.

Step 2 Grafting and Immobilization of Amine Compound #2

A second amine compound is added to the nanoclays to further enhance its $CO_2$ capture capacity. Polyethyleneimine (PEI) is used in this step. Treated nanoclay from Step 1 is dispersed in methanol and PEI also dispersed in methanol is added and stirred as described before. Amount of PEI added could be from 0.4 to 0.8 gm/1 gm nanoclay. The resulting dispersion is then dried in oven for an effective amount of time, for example but not limited to, at 75° C. for 12 hours to remove methanol. The resulting product is nanoclay in loose powder form with amine compounds immobilized on the surface, edges and between nanoclay layers.

Step 3 Grafting and Immobilization of Amine Compounds #1 and #2

To further enhance the $CO_2$ capture capacity, aminosilanes and PEI can be grafted on the nanoclays at the same time or sequentially wherein a second amine compound can be added to the nanoclays from step one to further enhance its $CO_2$ capture capacity. To accomplish this, the nanoclay is treated with aminosilane as described in step 1 and then PEI is immobilized as described in step 2. The resulting product has both aminosilane and PEI present on the surface of the nanoclay to work as $CO_2$ capture sites.

Carbon Dioxide Adsorption and Regeneration

A gas mixture containing carbon dioxide is passed through a bed of solid sorbents. A thermogravimetric analyzer was used to study the $CO_2$ adsorption behavior. Carbon dioxide is adsorbed by the solid sorbent and the carbon dioxide free gas leaves the bed. Once the solid sorbent is completely saturated, the bed temperature is raised and the carbon dioxide is desorbed resulting in regeneration of the solid sorbent.

Results

Adsorption experiments have shown the following results:

Test 1

To test for adsorption at atmospheric pressure, the nanoclay-based solid sorbent is placed in a thermogravimetric analyzer (TGA) and gaseous stream containing $CO_2$ is passed through and the weight gain by the solid sorbent is monitored as a function of time and temperature. The weight gain by the solid sorbent reflects the weight percent $CO_2$ capture by the nanoclay solid sorbent. When grafted with only APTMS, $CO_2$ adsorption capacity as a function of temperature at atmospheric pressure is shown in FIG. 1. When grafted with only PEI, $CO_2$ adsorption capacity as a function of temperature at atmospheric pressure is shown in FIG. 2. When both APTMS and PEI are used, $CO_2$ adsorption capacity as a function of temperature at atmospheric pressure is shown in FIG. 3.

FIGS. 1, 2, and 3 show that the nanoclay-based solid sorbents of the present invention have a wide range of temperature in which they can be used to capture $CO_2$. In addition, they are more effective at relatively higher temperatures, which means that the post-combustion flue gas will not need to be cooled down before passing it through a bed of these solid sorbents for $CO_2$ capture which would result in cost saving by avoiding a cooling step. This $CO_2$ adsorption capacity is comparable to other solid sorbents being developed by various research groups. Desorption is easily achieved by raising the temperature to only 100° C. and the solid sorbent can be regenerated and re-used over multiple cycles as shown in FIG. 4. Such low temperature for desorption is very desirable to reduce the parasitic power consumption and attendant cost of $CO_2$ capture plant.

Figure 6:
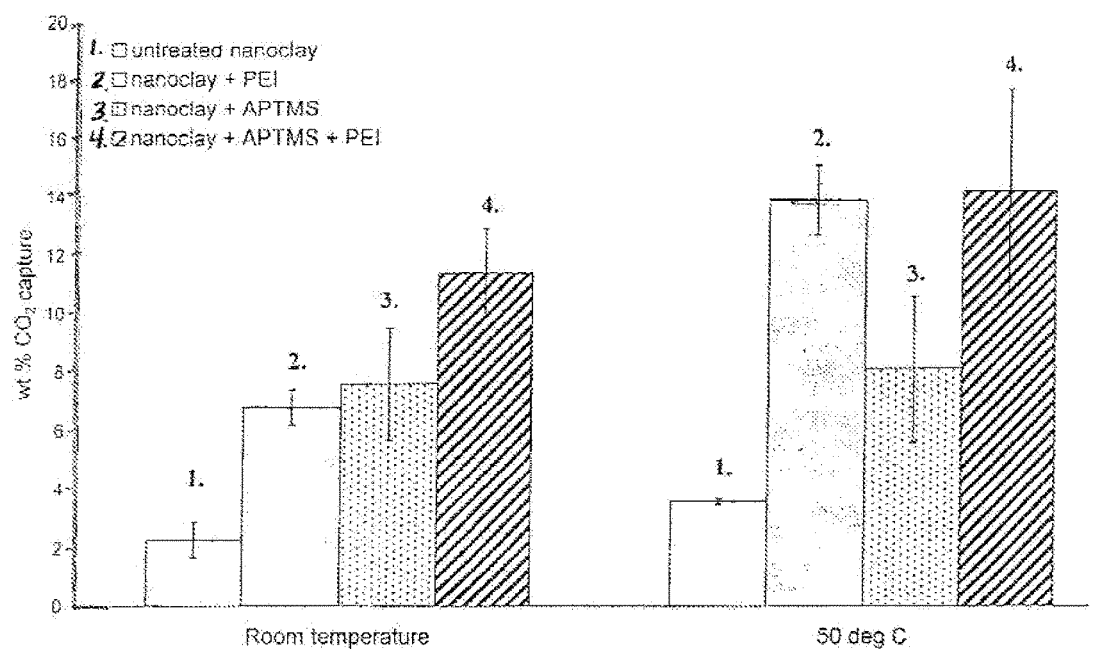
FIG. 6 is a graph that shows the $CO_2$ capture capacities at room temperature (about 21 degrees Centigrade) and 50° C., and 300 psi pressure for montmorillonite nanoclays treated with APTMS, PEI, or both, respectively.

To test the $CO_2$ capture for high pressure applications, a weighted amount of the treated nanoclay is sealed in a pressure vessel and the vessel is pressurized at pressures up to 300 psi with pure $CO_2$. After a period of time, the pressure vessel is depressurized and the nanoclay solid sorbent is weighed to determine the amount of $CO_2$ adsorbed. FIG. 5 shows $CO_2$ capture capacities at room temperature as a function of pressure and time. FIG. 5 shows at higher $CO_2$ pressures and room temperature (about 21 degrees Centigrade), amine grafted montmorillonite nanoclay shows even higher capture capacities. FIG. 6 shows the $CO_2$ capture capacities at room temperature (about 21 degrees Centigrade) and 50° C., and 300 psi pressure for montmorillonite nanoclays treated with APTMS, PEI, or both, and it can be seen that even higher capture capacities are obtained at high temperature and pressure. Thus from FIGS. 1-6 one can see that the nanoclay-based solid sorbents of this invention are capable of capturing $CO_2$ at wide range of temperature and pressure conditions.

Figure 7:
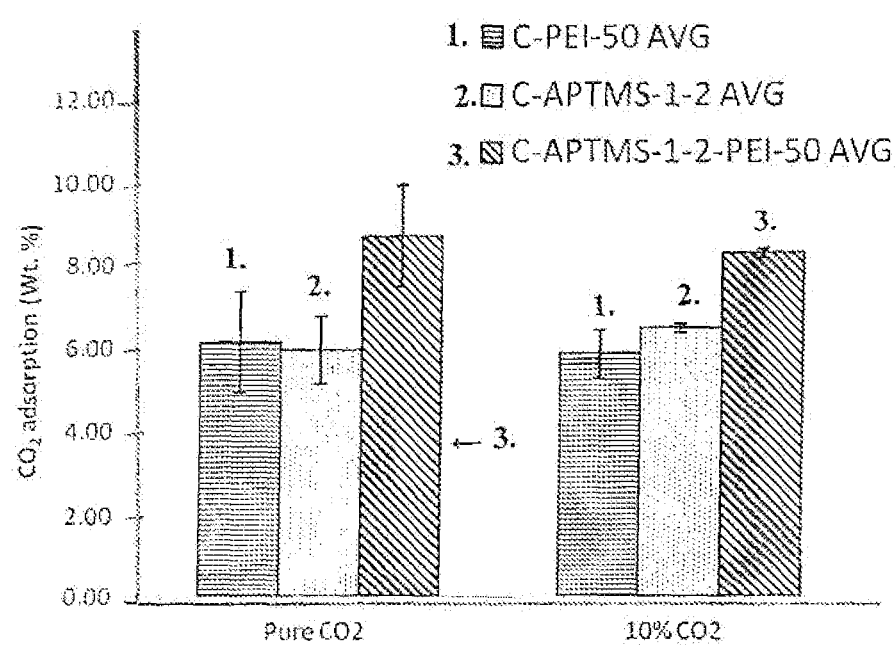
FIG. 7 is a graph that shows $CO_2$ capture capacity of montmorillonite nanoclays of this invention treated with APTMS, PEI, or both, respectively, in 10% $CO_2$ gas stream and its comparison with capture capacity in pure $CO_2$ gas stream.

Amine grafted montmorillonite nanoclay can also be used to capture $CO_2$ from dilute gas streams containing 10% or less $CO_2$ (balance being nitrogen or other gases) which is more representative of the actual post-combustion flue gases. FIG. 7 shows $CO_2$ capture capacity in 10% $CO_2$ and 90% nitrogen and its comparison with capture in 100% $CO_2$ gas. It can be seen that the nanoclay is equally effective in both cases.

Figure 8:
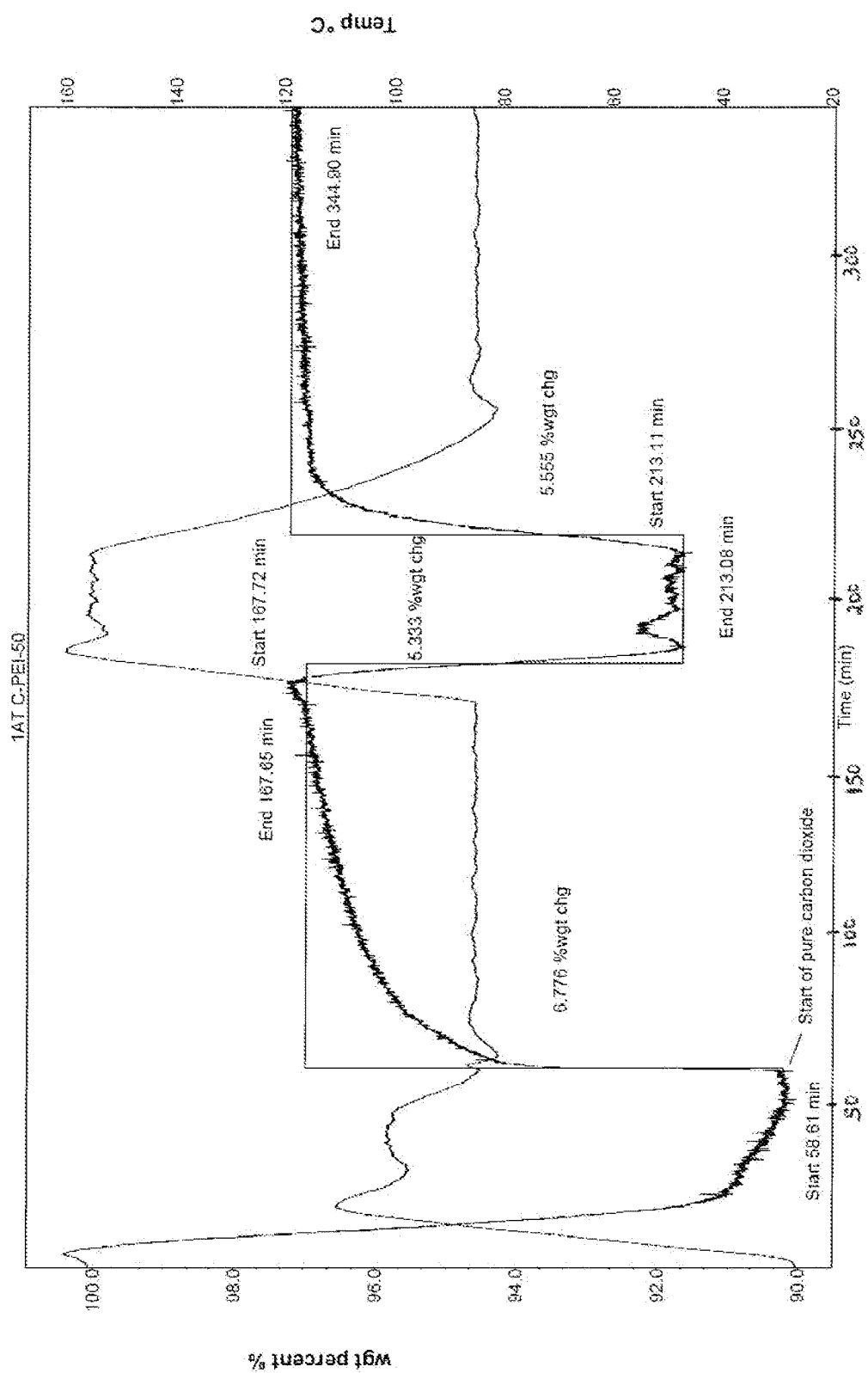
FIG. 8 is a graph that shows sorption and desorption for montmorillonite nanoclay treated with PEI, initially in pure nitrogen to 100° C. then switched to pure $CO_2$ for adsorption at 85° C. and desorption at 155° C. in $CO_2$ and readsorption at 85° C., and that $CO_2$ is adsorbed at 85° C. and when the temperature is raised to 155° C. the regeneration of the nanoclay occurs and the regenerated nanoclay can again capture the $CO_2$.

This amine grafted nanoclay can also be regenerated using $CO_2$ at 155° C. FIG. 8 shows sorption and desorption for montmorillonite nanoclay treated with PEI, initially in pure nitrogen to 100° C. then switched to pure $CO_2$ for adsorption at 85° C. and desorption at 155° C. in $CO_2$ and readsorption at 85° C., and that $CO_2$ is adsorbed at 85° C. and when the temperature is raised to 155° C. the regeneration of the nanoclay occurs and the regenerated nanoclay can again capture the $CO_2$.

Figure 9:
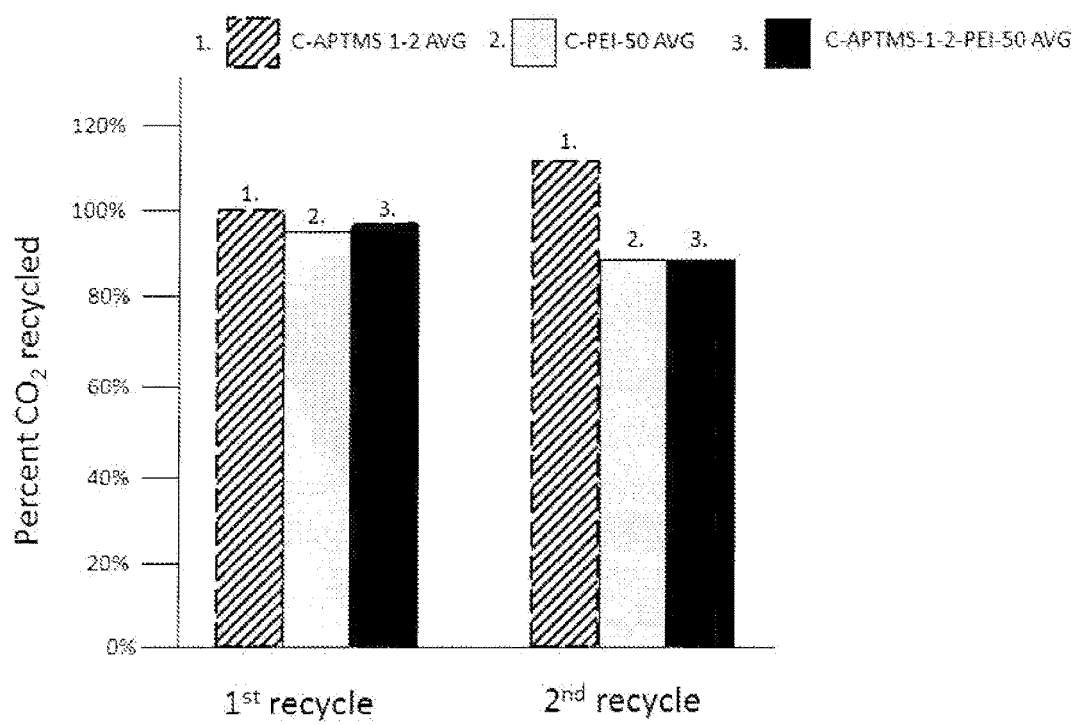
FIG. 9 is a graph that shows the percent remaining $CO_2$ capture capacity of various amine modified montmorillonite nanoclays of the present invention after regeneration using humid $CO_2$ at 155° C. for 30 minutes.

This amine grafted nanoclay can also be regenerated using $CO_2$ saturated with water vapor at room temperature (about 21 degrees Centigrade). FIG. 9 shows the percent remaining $CO_2$ capture capacity of montmorillonite nanoclays after regeneration using humid $CO_2$ at 155° C. for 30 minutes.

Test 2

The $CO_2$ adsorption capacity is comparable to other solid sorbents being developed by various research groups. For example, porous silica treated with APTMS adsorbs about 8.8 wt % (Gray et al., 2005) while PEI treated carbon nanotubes adsorb about 9.2 wt % (Dillon et al., 2008) $CO_2$ at atmospheric conditions. Desorption is easily achieved by raising the temperature to only 100° C. and the nanoclay-based solid sorbents of this invention can be regenerated and re-used over multiple cycles as shown in FIG. 4. Such low temperature for desorption is very desirable to reduce the parasitic power consumption and attendant cost of $CO_2$ capture plant.

Preparation with Layered Double Hydroxide (LDH) Nanoclay

Layered double hydroxide nanoclay can also be treated with amines to make solid sorbent for $CO_2$ capture. 1 gm of nanoclay can be treated with 0.5 to 2 gm of APTMS or other aminosilanes to graft amines. 0.5 gm to 1 gm of PEI can be added to either untreated LDH nanoclay or LDH nanoclay already treated with APTMS. Similar grafting and immobilization procedure can be developed for other nanoclays to attach amines to nanoclays.

Some examples of aminosilanes include, but not limited to, amiopropyltrimethoxysilane (APTES), N-3-trimethoxysilyl-propyl-ethylenediamine (AEAPTS), N-3-trimethoxysilyl-propyl-diethylenediamine (DAEAPTS), ethylhydroxyl-aminopropyl-trimethoxysilane (EHAPTMS), diethylhydroxyl-aminopropyl-trimethoxysilane (DEHAPTMS).

These terms and specifications, including the examples, serve to describe the invention by example and not to limit the invention. It is expected that others will perceive differences, which, while differing from the forgoing, do not depart from the scope of the invention herein described and claimed. In particular, any of the function elements described herein may be replaced by any other known element having an equivalent function. The examples are illustrative only and show methods to produce the compounds, but are not meant to limit the production to those methods only as one skilled in the art could change the examples to produce the compounds without undue experimentation.

What is claimed is:

1. A regenerative nanoclay based solid sorbent consisting essentially of:
   a layered nanoclay with at least one surface, and
   at least one amine containing compound that is immobilized to the surface of said nanoclay by coating the substantial entirety of said surface forming an immobilized amine, wherein said immobilized amine is easily removable from said surface of said nanoclay by washing or frictional mechanical means; and
   at least another amine containing compound that is grafted onto the at least one surface of said nanoclay, wherein said grafted amine compound is not easily removable from said surface of said nanoclay by washing or frictional mechanical means, wherein said grafted amine compound is selected from the group consisting of an organoamine and an aminosilane, wherein said surface of said nanoclay includes at least one of an edge of a platelet of said nanoclay, an interior portion of said nanoclay, and an exterior portion of said nanoclay, and at least one edge of a platelet, an interior portion, and an exterior portion of each layer of said nanoclay, wherein said layered nanoclay adsorbs carbon dioxide at a temperature ranging from 50° C. to 85° C. and desorbs carbon dioxide in the presence of carbon dioxide at a temperature ranging from 100° C. to 155° C. for a resultant multiple cycle regenerative nanoclay based solid sorbent for producing a pure carbon dioxide stream, and wherein said layered nanoclay has a sustainable carbon dioxide capacity of at least 85 percent of an initial carbon dioxide capacity after three cycles of regeneration, wherein said nanoclay is selected from the group consisting of a montmorillonite, a bentonite, a kaolinite, a halloysite, and a synthetic nanoclay.

2. The nanoclay based solid sorbent of claim 1 wherein said synthetic nanoclay is a mixed-metal hydroxide nanoclay.

3. The nanoclay based solid sorbent of claim 1 wherein said synthetic nanoclay is a layered double hydroxide nanoclay.

4. The nanoclay based solid sorbent of claim 1 wherein said synthetic nanoclay is selected from the group consisting of a laponite, a hectorite, a saponite, an indonite, and a sepiocite.

5. The nanoclay based solid sorbent of claim 1 wherein said organoamine is a polyamine.

6. The nanoclay based solid sorbent of claim 1 wherein said aminosilane is selected from the group consisting of an aminopropyltrimethoxysilane, an amiopropyltrimethoxysilane, a N-3-trimethoxysilyl-propyl-ethylenediamine, a N-3-trimethoxysilyl-propyl-diethylenediamine, an ethylhydroxylaminopropyl-trimethoxysilane, and a diethylhydroxyl-aminopropyltrimethoxysilane.

7. The nanoclay based solid sorbent of claim 1 wherein said organoamine is polyethyleneimine.

8. The nanoclay based solid sorbent of claim 1 wherein said amine containing compound that is grafted onto said surface of said nanoclay is selected from the group consisting of an aminopropyltrimethoxysilane, an amiopropyltrimethoxysilane, a N-3-trimethoxysilyl-propyl-ethylenediamine, a N-3-trimethoxysilyl-propyl-diethylenediamine, an ethylhydroxylaminopropyl-trimethoxysilane, and a diethylhydroxyl-aminopropyltrimethoxysilane.

9. The nanoclay based solid sorbent of claim 1 wherein said amine containing compound that is immobilized onto said surface of said nanoclay is polyethyleneimine.

10. The nanoclay based solid of claim 1 wherein said amine containing compound that is grafted onto said surface of said nanoclay is aminopropyltrimethoxysilane, and wherein said amine containing compound that is immobilized onto said surface of said nanoclay is polyethyleneimine.

11. The nanoclay based solid sorbent of claim 1, wherein said layered nanoclay adsorbs carbon dioxide at 85° C.

* * * * *